Dec. 21, 1926.
H. V. REED
1,611,557
CLUTCH
Filed March 5, 1925
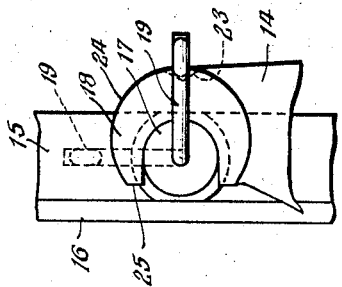
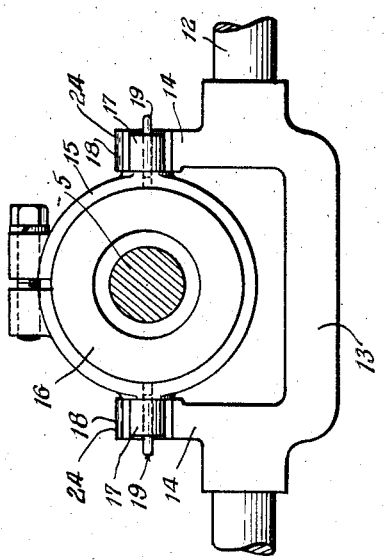
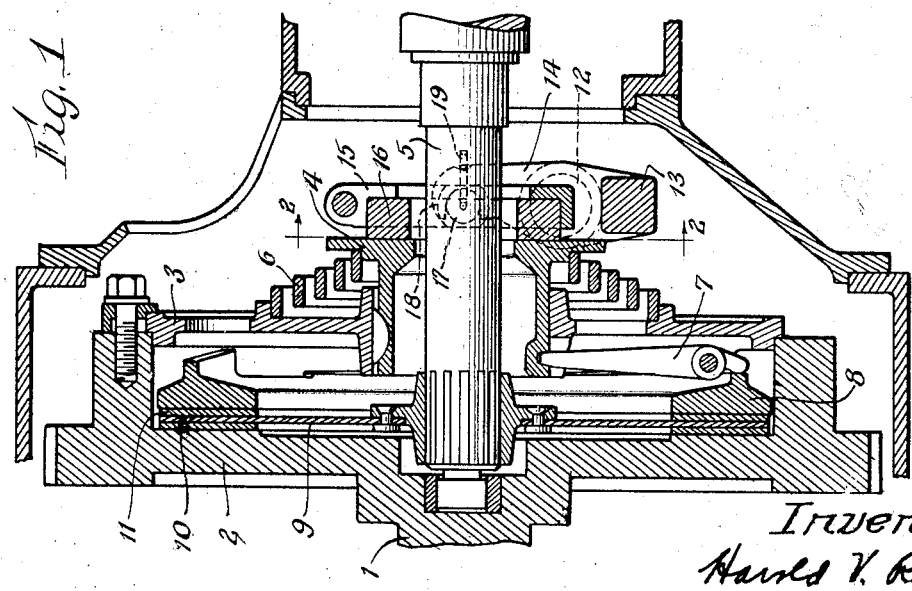
Inventor:
Harold V. Reed
By: Wm. O. Belt
Atty.

Patented Dec. 21, 1926.

1,611,557

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

CLUTCH.

Application filed March 5, 1925. Serial No. 13,024.

A clutch is usually provided with a clutch release lever, to give movement, longitudinally of the driven shaft, to a sleeve mounted concentric with said shaft, movement of the sleeve controlling the action of the clutch. Between the clutch release lever and the sleeve, it has been customary to provide a fork attached to the lever and carrying a bearing member having frictional contact with the sleeve, so as to transmit longitudinal movement from the lever to the sleeve. The sleeve rotates with one of the rotating parts of the clutch and therefore when the member carried by the fork is brought in contact with the sleeve, there is a tendency for this member also to rotate.

It is therefore one of the principal objects of my invention to provide means for retaining the fork and the member carried thereby in engagement at all times and to avoid the possibility of their becoming separated.

Another object of my invention is to provide a fork having fingers of a type which will economize space to the utmost and which shall engage and hold the aforesaid member in correct position at all times.

A further object of my invention is to provide a fork, having means for receiving the aforesaid member together with a novel and improved retainer for holding the member in place in the bearings, the construction being such as to permit ready assemblage of the parts.

A still further object of my invention is to provide means for supporting a member of the above character in a fork in such a way as to avoid chattering or other noise and thus avoid the necessity for extreme accuracy in machining the various parts.

In the accompanying drawings in which I have shown a selected embodiment of my invention:

Fig. 1 is a longitudinal sectional view through a clutch and showing my invention embodied therein.

Fig. 2 is a section on the line 2—2 of Fig. 1.

Fig. 3 is a fragmentary end elevation of the structure shown in Fig. 2 on an enlarged scale, the view being taken from the right of Fig. 2.

Fig. 4 is a plan view of the structure shown in Fig. 3.

Fig. 5 is a view similar to Fig. 4, but showing a modified form of my invention.

Referring now to the drawings, the numeral 1 designates a driving shaft, having a fly-wheel 2 thereon, upon which is adjustably mounted the plate 3 to which is slidably keyed the clutch release sleeve 4, concentric with the driving shaft 1 and with the driven shaft 5. Between the plate 3 and the sleeve 4 is disposed a coiled spring 6 tending to cause relative movement therebetween. Mounted on the plate 3 are a plurality of levers 7, having one end of each lever engaged with the sleeve 4 and the other end of each lever contacting with the cam ring 8. Splined upon the driven shaft 5 is a friction disk 9 carrying friction rings 10 and 11 on either side thereof, the friction ring 10 being in engagement with the face of the fly-wheel 2 and the friction ring 11 lying between the friction disk 9 and the cam ring 8. By this means the spring 6 normally urges the cam ring 8 to the left as viewed in Fig. 1 and causes the shafts 1 and 5 to be clutched together.

For causing release of the clutch, as just described, there is provided a clutch release lever 12 having a fork 13, provided with a pair of fingers 14, between which passes the driven shaft 5. Supported by the fingers 14 is a cup member adapted to transmit motion from the lever to the sleeve 4, it being evident that by forcing the sleeve 4 to the left, as viewed in Fig. 1, the clutch will be released. The aforesaid cup member comprises a collar 15 carrying the anti-friction bearing 16 which contacts with the end of the sleeve 4. The anti-friction bearing is preferably formed of a material which will compensate for the wear between the flywheel and the friction disk and between the friction disk and the cam ring. This construction is more fully described and claimed in the co-pending application of David E. Gamble, Serial No. 747,460 filed November 3rd, 1924.

The collar 15 is provided with trunnions 17, one on either side thereof and supported by the fingers 14. If the fingers had bearings to receive the trunnions, which bearings were open at the top, there would be a tendency for one trunnion to rotate out of its bearing, because of the force exerted by the sleeve 4 in its rotation with the fly-wheel 2. I, therefore, provide the fingers with the bearings of the type shown, forming the ends of the fingers in hooks 18 opening at one side, preferably inwardly towards the face of the sleeve 4. By this construction not only is the tendency for a trunnion to rotate out of the bearings resisted by the hook shaped bearing, but it is possible to place the fork and lever much closer to the sleeve 4 without interference with any of the other parts of the clutch, thereby economizing space.

In order to retain the cup in the fork of the release lever with the trunnions 17 in their bearings, I provide a retainer in the form of a spring 19, having one end 20 received within a bore in the end of a trunnion. The intermediate portion 21 is bent substantially parallel to the end of the trunnion and then bent back substantially parallel to the end 20 and terminating in a reverse curve 22 adapted to seat within a recess 23 at the back of the bearing formed by the bearing hook 18.

Referring particularly to Fig. 3, it will be seen that the outside surface 24 of the hook 18 is in the form of a cam, the extreme end 25 thereof being substantially closer to the center of the trunnion than is the portion adjacent the recess 23. Therefore, when the parts are being assembled, the retainer 19 is placed in the position shown in dotted lines in Fig. 3, the end 20 being received within the bore in the trunnion and then rotated clockwise, as viewed in Fig. 3, until the curved end 22 snaps into the recess 23. The retainer will hold the trunnion securely in place in the bearing so that there is no danger of its working therefrom, and furthermore the retainer will hold the trunnion securely against the bearing so that there will always be frictional engagement therebetween thus avoiding chattering and wear due to loose fitting parts. Furthermore, the necessity for extreme accuracy in machining of these parts in thus avoided, as any slight inaccuracy will be overcome by the action of the retainer holding the parts in constant engagement.

Referring now to Fig. 5, I have shown a modified form of my invention in which the retainer 26 has one end 27 fitting within the bore in the trunnion 17 and has the other end 28 bent substantially parallel to the end 27 and terminating in a hook 29 entering a recess in the back of the hook shaped bearing 18. This form is not as desirable as that shown in Fig. 4 because it is not so easy to assemble and takes up more space, but I have found it to be perfectly satisfactory so far as efficient results are concerned.

I am aware that changes in the form, construction and arrangement of parts may be made without departing from the spirit and without sacrificing the advantages of the invention and I reserve the right to make all such changes as fairly fall within the scope of the following claims.

I claim:

1. In a clutch, a cup member comprising a bearing collar and trunnions on said collar, a fork provided with fingers, bearings on said fingers to receive said trunnions, said bearings opening at one side of said fingers in a direction parallel with the axis of the clutch, and means securing said trunnions in said bearings.

2. In a clutch, a clutch release sleeve, a cup member comprising a bearing collar and trunnions on said collar, a fork provided with fingers, bearings on said fingers to receive said trunnions, said bearings opening towards said sleeve and in a direction parallel with the axis of the clutch, and means securing said trunnions in said bearings.

3. In a clutch, a clutch release sleeve, a cup member comprising a bearing collar and trunnions on said collar, a fork provided with fingers, bearings on said fingers to receive said trunnions, said bearings opening towards said sleeve and in a direction parallel with the axis of the clutch, and resilient means for securing said trunnions in said bearings.

4. In a clutch, a cup member comprising a bearing collar and trunnions on said collar, a fork provided with fingers, bearings on said fingers opening at one side thereof and to receive said trunnions, and resilient retainers engaging the trunnions and the fingers to secure the cup member in the fork.

5. In a clutch, a bearing collar, trunnions on said collar, a fork provided with fingers, bearings on said fingers, retainers securing said trunnions in said bearings, each retainer comprising a spring having one end received in a bore in the trunnion and the other end being curved to engage in a recess in said bearing.

6. In a clutch, a bearing collar, a trunnion on said collar, a finger in the shape of a hook to form a bearing for said trunnion, and a retainer engaging said trunnion and said finger to hold said trunnion in said bearing.

7. In a clutch, a bearing collar, a trunnion on said collar, a finger in the shape of a hook to form a bearing for said trunnion, and a retainer engaging said trunnion and said finger to hold said trunnion in said bearing, said retainer comprising a spring having one end received in a bore in said trunnion and the other end engaging a recess in the outer surface of said hook.

8. In a clutch, a bearing collar having a trunnion, a finger having a hook forming a bearing to receive said trunnion, and a retainer comprising a spring having one end received in a bore in said trunnion and the other end bent into a reverse curve and engaged in a recess in the outer surface of said hook.

9. In a clutch, a bearing collar having a trunnion, a finger having a hook forming a bearing to receive said trunnion, and a retainer comprising a spring having one end received in a bore in said trunnion and the other end bent into a reverse curve and engaged in a recess in the outer surface of said hook, said outer surface being formed as a cam, the extreme end thereof being nearer to the center of said trunnion than is the portion adjacent the recess.

HAROLD V. REED.